United States Patent [19]
Chen et al.

[11] Patent Number: 5,822,524
[45] Date of Patent: Oct. 13, 1998

[54] SYSTEM FOR JUST-IN-TIME RETRIEVAL OF MULTIMEDIA FILES OVER COMPUTER NETWORKS BY TRANSMITTING DATA PACKETS AT TRANSMISSION RATE DETERMINED BY FRAME SIZE

[75] Inventors: Huey-Shiang Chen; Mon-Song Chen, both of Katonah, N.Y.; Shiow-Laang Huang, Herndon, Va.; Deyang Song, Oradell, N.J.

[73] Assignee: Infovalue Computing, Inc., Elmsford, N.Y.

[21] Appl. No.: 505,488

[22] Filed: Jul. 21, 1995

[51] Int. Cl.⁶ .................................................. G06F 13/00
[52] U.S. Cl. ...................................................... 395/200.33
[58] Field of Search ............................... 395/600, 200.33, 395/200.47, 200.49, 200.61, 200.76; 358/468; 370/60.1, 84, 94, 60; 364/200; 360/73; 235/375; 381/41; 375/13, 357; 348/7, 10, 12, 13, 14

[56]  References Cited

U.S. PATENT DOCUMENTS

| | | | |
|---|---|---|---|
| 4,001,690 | 1/1977 | Mack et al. | 370/316 |
| 4,027,337 | 5/1977 | De Loye et al. | 360/73 |
| 4,051,530 | 9/1977 | Kuroda et al. | 348/415 |
| 4,606,044 | 8/1986 | Kudo | 375/13 |
| 4,630,196 | 12/1986 | Bednar, Jr. et al. | 364/200 |
| 4,729,020 | 3/1988 | Schaphorst et al. | 358/133 |
| 4,833,535 | 5/1989 | Ozeki et al. | 348/400 |
| 4,839,891 | 6/1989 | Kobayashi et al. | 370/94 |
| 5,025,457 | 6/1991 | Ahmed | 370/507 |
| 5,029,164 | 7/1991 | Goldstein et al. | 370/235 |
| 5,126,845 | 6/1992 | Yamashita | 358/160 |
| 5,136,655 | 8/1992 | Bronson | 381/41 |
| 5,208,810 | 5/1993 | Park | 370/230 |
| 5,237,156 | 8/1993 | Konishi et al. | 235/375 |
| 5,262,875 | 11/1993 | Mincer et al. | 348/6 |
| 5,319,638 | 6/1994 | Lin | 370/60 |
| 5,428,774 | 6/1995 | Takahashi et al. | 395/600 |
| 5,446,734 | 8/1995 | Goldstein | 370/397 |
| 5,457,687 | 10/1995 | Newman | 370/232 |
| 5,463,422 | 10/1995 | Simpson et al. | 348/390 |
| 5,491,565 | 2/1996 | Naper | 358/468 |
| 5,491,801 | 2/1996 | Jain et al. | 395/200.71 |
| 5,497,404 | 3/1996 | Grover et al. | 375/357 |
| 5,515,511 | 5/1996 | Nguyen et al. | 395/200.49 |
| 5,521,630 | 5/1996 | Chen et al. | 348/7 |
| 5,533,021 | 7/1996 | Branstad et al. | 370/60.1 |
| 5,541,919 | 7/1996 | Yong et al. | 370/61 |
| 5,544,170 | 8/1996 | Kasahara | 370/253 |
| 5,550,982 | 8/1996 | Long et al. | 395/200.13 |
| 5,566,175 | 10/1996 | Davis | 370/84 |
| 5,583,561 | 12/1996 | Baker et al. | 348/7 |
| 5,621,660 | 4/1997 | Chaddha et al. | 395/200.77 |
| 5,633,859 | 5/1997 | Jain et al. | 370/234 |
| 5,644,355 | 7/1997 | Koz et al. | 348/17 |
| 5,666,161 | 9/1997 | Kohiyama et al. | 348/408 |
| 5,721,878 | 2/1998 | Ottesen et al. | 348/7 |

FOREIGN PATENT DOCUMENTS

| | | | |
|---|---|---|---|
| 62-299148 | 12/1987 | Japan | H04L 13/00 |
| 02-092153 | 3/1990 | Japan | H04N 1/32 |
| 03-133255 | 6/1991 | Japan | H04N 1/32 |
| 04-72838 | 3/1992 | Japan | H04L 7/00 |
| 06-014080 | 1/1994 | Japan | H04L 29/06 |

*Primary Examiner*—Moustafa M. Meky
*Attorney, Agent, or Firm*—Eliot S. Gerber

[57]  ABSTRACT

A method in computer networks in which a client machine (playback client computer) requests multimedia files, such as compressed video clips, from a server (storage server computer). The transmission uses digital data packets. In the case of video files, the packet headers identify the video frame and the sequence number of each packet derived from the frame. The transmission timing is not based on a steady byte stream or an average of bytes to be transmitted. Instead, in the case of video, the frame rate determines normal transmission and a frame is transmitted during each frame time. The client agent has a normal packet buffer, normally holding 1–5 video frames. The transmission rate is adjusted to keep that buffer filled within its normal range. The timing information required for transmission, in one embodiment, is stored in a separate index file associated with each multimedia file.

42 Claims, 6 Drawing Sheets

SYSTEM FOR JUST-IN-TIME RETRIEVAL OF MULTIMEDIA FILES OVER COMPUTER NETWORKS BY TRANSMITTING DATA PACKETS AT TRANSMISSION RATE DETERMINED BY FRAME SIZE

FIELD OF THE INVENTION

The present invention relates to methods for retrieval of multimedia files, such as video, over computer networks.

BACKGROUND OF THE INVENTION

Multimedia computing has recently emerged as an important information technology. Multimedia computing obtains information from a variety of media retained in information storage in the form of digital data, for example, motion video clips (segments) and audio clips. This allows businesses and non-profit organizations to create highly effective computer presentations and, using computers, provide superior training and education.

For example, instead of storing paper technical manuals, which must be searched manually, workers on a manufacturing floor could use a computer terminal, called a "client machine", to interactively access a large collection of multimedia training materials stored in a centralized "server". A "client machine" is a computer or terminal having a screen that an individual uses to access and display video files. It has at least three component processes: MM (Multimedia) application, i.e., the display of a video clip; Client Agent, i.e., software (computer program to access the server) and Network Interface, i.e., an interface card. A server (server machine) is a computer, for example, a "mini-computer" or workstation computer or super-computer, connected to a number of computer terminals (client machines) in a Local Area Network (LAN) or other computer networks, such as metropolitan area networks, i.e., FDDI and high speed wide areas networks, such as ATM. The server stores and delivers digital video clips to multiple client machines in a network. The server includes, at least, three component process: Network Interface, i.e., an interface card; Server Control, i.e., software to control access and delivery of stored video clips; and Storage Subsystem, i.e., digital memory storage of video. In interactive access, the user operates his client machine to request multimedia files from the server for display on the screen of the client machine and the server responds to the user's requests. For example, a worker, at the press of a key, could have the server retrieve more detail, on the subject of his choice, using text and video. In this arrangement, a centralized server (as opposed to an individual computer) stores the necessary multimedia information. This arrangement exists because video clips (usually video 0.1 to 10 minutes long) require a large amount of computer storage. For example, a one-minute video clip, compressed, may be over 12,000,000 bytes (12 Mb—a byte here being 8 digital bits) in size. Thus, having a large selection of video clips on the individual computers of a network would not be economical. Multimedia technology may also provide new forms of entertainment, video-on-demand being one well-known example. In a video-on-demand system, a centralized networked storage server stores a large collection of videos, such as entire full-length feature films in video form (90–180 minutes). A plurality of users may simultaneously retrieve their preferred video features at their selected viewing times.

Multimedia computing has significantly greater processing power and storage requirements than computing that only involves text and numeric data. Typical motion video, for example, has data rates (rates of information flow) well exceeding 100 Mbps (million bits (megabits) per second), without compression, and between 1 to 8 Mbps with video compression. Video compression uses algorithms to pack video data in a form taking up less memory and requiring less transmission speed. It strives to make the data look realistic when it is played back on a computer monitor screen or TV set. "Video playback boards" are hardware used to decompress data and utilize various compression standards. These compression standards, which vary in their Mbps utilization, govern the viewing quality of videos. Compression standards include Indeo (1.2 Mbps), MPEG-1 (Motion Picture Experts Group-1) (1.5 Mbps), motion JPEG (Joint Photographic Experts Group) (5–6 Mbps) and MPEG-2 (Motion Picture Experts Group-2) (6–8 Mbps).

In most situations, only compressed video can be stored and delivered across networks due to the limits of transmission speed and computer memory. Even with compression, however, video still has a high memory storage requirement, and thus is ideal for client server configurations in a data network. In those configurations, a server holds compressed video clips although, less preferably, it may hold uncompressed video clips and compress the video as it transmits it. Many client machines, which individuals control, can access the server and obtain the video clips in compressed form. The client machine then decompresses the video clips and displays them on its screen for the user to view. Hence, the high cost of installing expensive large capacity storage in all client machines is avoided.

However, transmitting multimedia data across computer networks for immediate playback at the receiving end is complicated by both the nature of computer networks and the elaborate processing necessary for effective playback. Today's prevalent computer networks use statistical multiplexing for transmission. This process "packetizes", i.e., divides data into segments so that it can be transmitted within and between computers. The data, in packet format, can then be transmitted through a series of store-and-forward operations, because the packet contains a "header", which is a set of bytes identifying the packet and usually identifying its destination, i.e., the identity of the computer to which it should be transmitted. Each time a networking computer stores-and-forwards (puts into its memory and then transmits to another computer) an additional element of variable delay is added to the end-to-end transmission latency (the time it takes to move a packet from one end of the network to another). The variability of this store-and-forward delay depends on the number of other packets that are queued (waiting in line) and competing for the same transmission resources. Due to this variability, different packets of the same video stream experience differential transmission latency (different amounts of delay). This differential latency causes a phenomenon known as "delay jitter", which the viewer sees as jerky motion and inferior or unacceptable picture quality.

The prevailing approaches to transmission of video over computer networks focus on transmitting the same average rate of data to the client machines from the server. The average rate, in bytes per second, is computed by dividing a file's total size by its playback length (in seconds). This average data rate, however, only indirectly measures motion smoothness, because video frame sizes may vary by as much as a factor of 10. In MPEG-1 (Motion Picture Experts Group), a video compression standard, the size of an I (Intra) frame, on average, is about 2 to 3 times that of a P (Predictive) frame, and the size of a P frame is about 4 to 5 times that of a B (Bi-directional interpolated) frame.

Due to their isochronous property (regular timing of a stream), transmission of multimedia data files requires consideration of factors that traditional data transport protocols, such as TCP/IP, do not consider. Transmission of video requires that frames are played back at fixed intervals (fixed time frames) to ensure motion smoothness and thus viewing quality. Traditional systems such as TCP/IP simply manage the data in blocks, addressing only throughput but not timing considerations. New proposals tailored for transmitting multimedia files focus on utilizing additional and/or stronger network functionality, such as priority transmissions and guaranteed bandwidth. Guaranteed bandwidth means that a transmission will always have up to a specific amount of information-carrying capacity reserved for its use. While these approaches provide some improvement, they still treat a multimedia file as a byte stream, and consequently aim to maintain an average transmission rate. Such an average transmission rate does not take into account the variability in individual frame size, i.e., how many bytes are in each frame.

Given the large variations in frame sizes, frame rates and end-to-end transmission latencies, it is not efficient to treat a multimedia file simply as a byte stream. However, that is the conventional and prevailing approach which is presently being commercially implemented. Even though both video and text are transmitted in the form of digital data in packet format, video transmission is more problematic. To regulate the flow of video transmissions, the client machines and server machines should frequently exchange control messages. These messages should result in adjustments of the rate of data flow. A need exists for an efficient method for a client machine to retrieve multimedia data from a server with minimum latency (delay) and minimum overhead (use of memory and processing); with flexibility in satisfying a variety of application requirements; with the final picture on the client machine monitor being of high quality, i.e., not being jerky; and without the use of additional memory or other additional hardware.

SUMMARY OF THE INVENTION

The present invention provides a method for a client machine to retrieve multimedia data from a server machine with minimum latency and overhead. The method is preferably implemented by installing software programs on the client machines and server, without any hardware changes; assuming that the client machine and server have sufficient memory and the client machine has adequate video decompression capabilities.

The method of the present invention also provides multimedia data as readily available to application programs as if that data were in the form of files in the data memory storage of the client machine. This invention minimizes the amount of buffer (memory space for temporarily storing multimedia data) in the client machine.

Accordingly, this invention is a method for retrieving multimedia files from a server computer to a client computer over computer networks.

In the preferred embodiment the server transmits the multimedia file in the form of digital data packets. The transmission rate is based on the frame rate of the file. There is no attempt to provide an even data stream based on averaging.

First, there is provided a means for extracting essential timing information which has been specified in the multimedia file. Multimedia data streams have well-defined building blocks (objects) which should be the basis for transmission timing in order to insure playback quality. In MPEG-1 motion video (Motion Picture Experts Group-1), a video compression standard, the video picture or frame serves as the building block. Although a constant number of video frames are played in 1 second, generally 30, the amount of data in one second of video varies with the complexity of its content. For example, a video clip showing a bar graph has low complexity compared to a video clip of a football game.

Secondly, the present invention uses the timing information in the index file to (i) ensure transmission of a video frame in a frame time under normal circumstances, e.g., 30 frames per second, and (ii) provide an explicit hand-shake protocol (a series of back and forth prearranged digital messages coordinating a set of operations) between client agent and server processes. This protocol regulates the transmission rate in exceptional situations.

Thirdly, the present invention provides a process in the client agent to receive data from the server with minimum latency (delay); with minimum overhead (use of memory and processing resources); and with the flexibility to satisfy a variety of application requirements. The process in the client agent has the intelligence to selectively execute the explicit processing required for additional features when such additional features are needed.

Finally, this invention provides a process in the client machine to monitor and log the behavioral characteristics of the applications. The log enables the process in the client machine to fine-tune its processing during run time (the time it is operating) and optimize its interactions with the process in the server computer.

This invention times the transmission of multimedia files according to a fixed rate, generally the frame rate during normal transmission. For example, if the client machine can display 30 frames per second, the server will transmit a frame of compressed video starting at each ⅟30th second, regardless of the complexity of the video frame. The client machine needs to store in its memory only one, or a few, frames as new frames are transmitted to it at a regular rate (frame rate). However, if the data in the buffer of the client agent is below a selected standard ("water mark"), the transmission rate is increased; if above a selected standard it is decreased.

DESCRIPTION OF THE PREFERRED EMBODIMENTS

Figure 1:
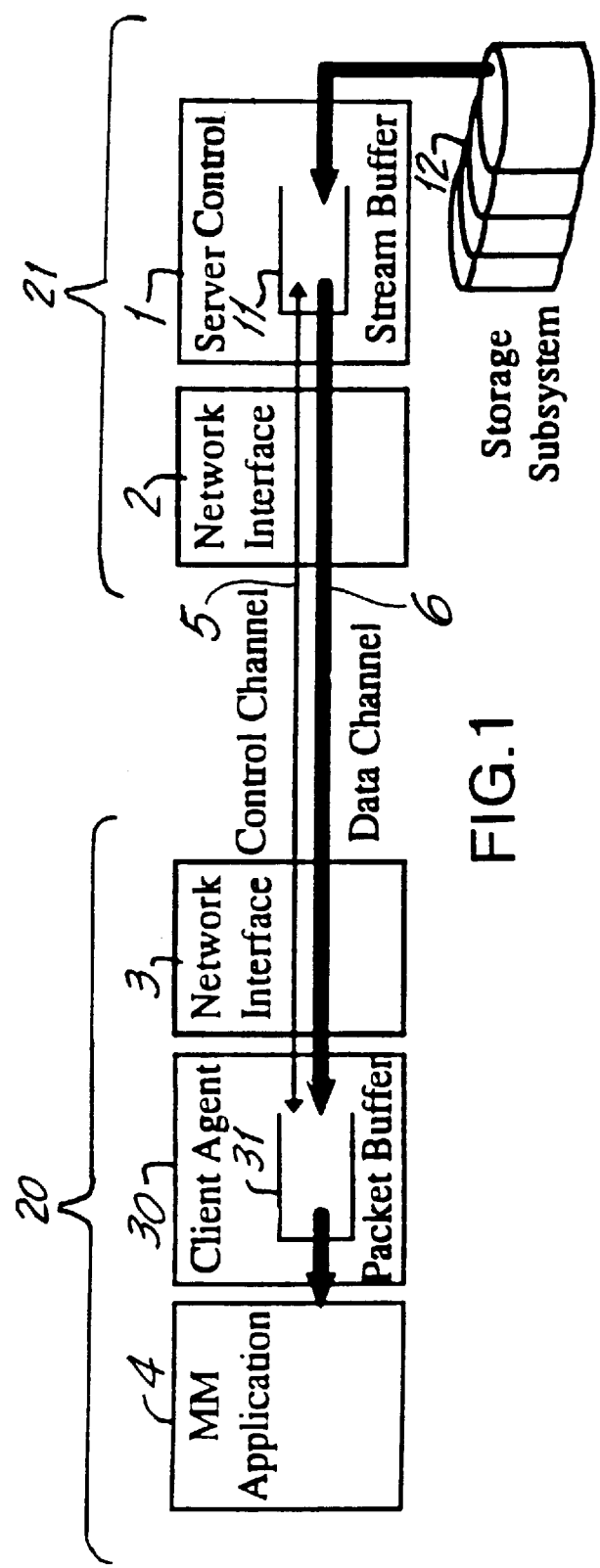
FIG. 1 is a schematic illustration (block diagram) of the client machine retrieving multimedia data from the server machine over a computer network.

FIG. 1 represents schematically the overall system. The client machine (20) is the computer upon which a user types his commands, for example, a PC (Personal Computer)

which may have a relatively low end integrated circuit microprocessor such as an Intel (TM) 386 processor, although any type of PC may be used. The user wishes to retrieve multimedia files from the server (21) via data connections and over a computer network. The client machine (20) has three interacting processes: the client agent (30) which interfaces with the network interface (3) and the multimedia application (4) in the client machine. For example, the server (21) may be a workstation such as a Sun (TM) workstation or IBM PC Server 300 and having a high throughput and storage capability, for example, using a disk array. A typical multimedia application is the playback of a full-motion video clip. The network, for example, may be an Ethernet (bus network topology) which may be implemented with coaxial wiring and 1000–3000 feet between nodes, or a Token Ring system (high speed token that checks in at each node, available from IBM).

The client agent (30) has the primary responsibility of retrieving from the server control (1) the right set of multimedia data at the right time to satisfy the needs of the multimedia application (4). The client agent (30) maintains a packet buffer (31) (a structure for temporary data storage) as a cache storage (temporary data storage center). For example, the packet buffer (31) may be a section of the RAM (Random Access Memory) of the PC. Correspondingly, the primary responsibility of the server (21) is to read from disks and make just-in-time delivery of the appropriate set of multimedia data. The server (21) has three component processes: the server control (1) which interfaces with the storage subsystem (12) and with the network interface (2). Similar to the packet buffer (31) in the client agent (30), a stream buffer (11) in the server control (1) holds the data that has been read from the storage subsystem (12). The stream buffer (11) serves as a temporary data storage center for the server control (1).

The interactions between the server control (1) and the client agent (30) go through the network connecting the two machines. The network interface (2) in the server (21) and the network interface (3) in the client machine (20) support network connectivity. Specifically, the present embodiment uses two logical connections. The control channel (5) serves to exchange control messages. The data channel (6) serves to transmit multimedia data from the server (1) to the client agent (30). One possible implementation would use a reliable TCP protocol line for the control channel, and a fast and mostly reliable UDP protocol for the data channel.

Figure 2:
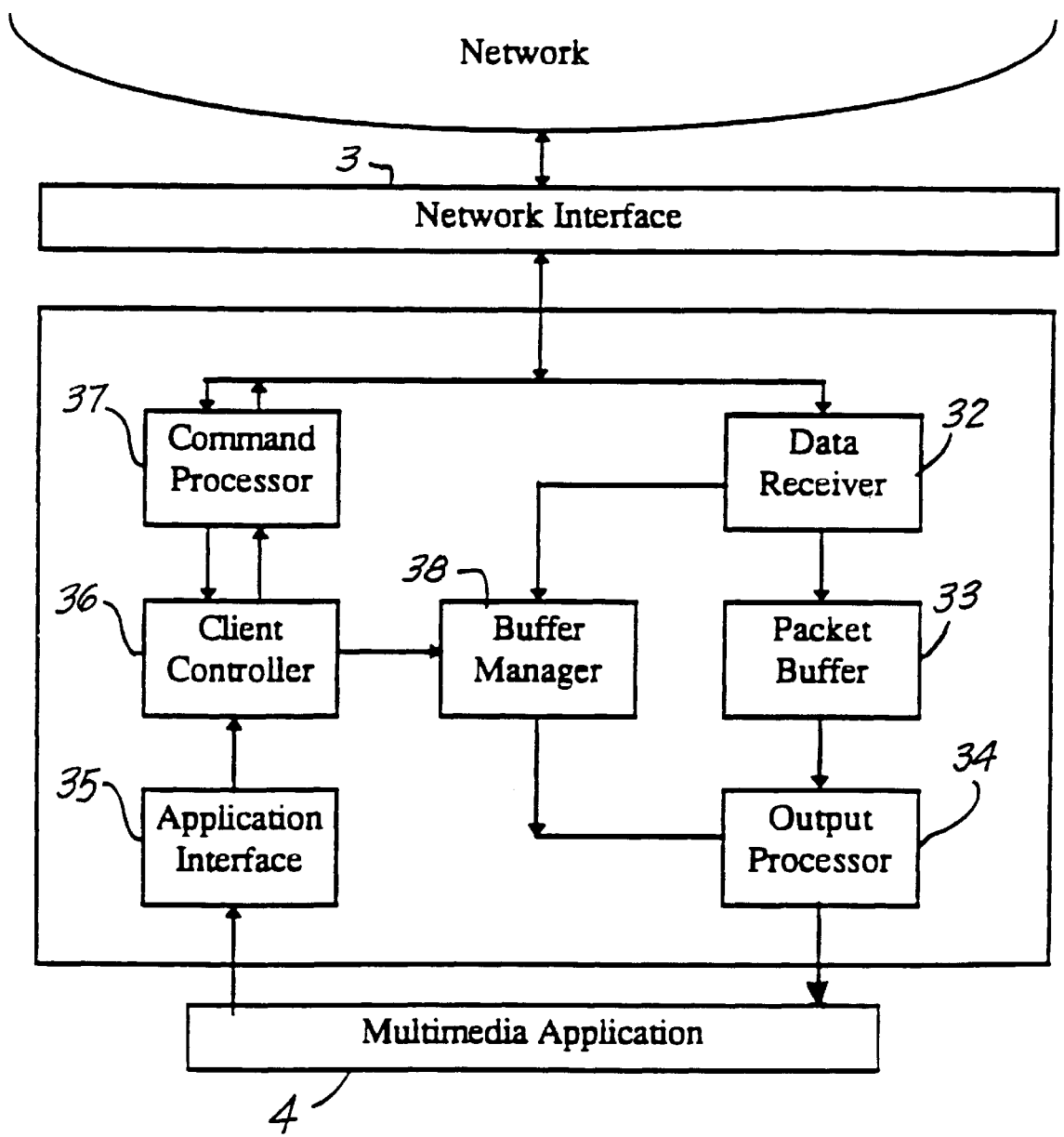
FIG. 2 is a schematic illustration of the structure of the client agent.

FIG. 2 schematically represents the preferred detailed structure of the client agent (30). As depicted in FIG. 1, the client agent (30) interfaces with the network interface (3) and the multimedia application (4). Two execution paths exist, one for data and one for control messages. The data execution path starts from the data receiver (32), which receives incoming data packets from the network. Then the data receiver (32) signals the buffer manager (38) to place the data packets properly into the structure of the packet buffer (33). The application interface (35) accesses the multimedia application 4 and translates its commands to the client controller 36. The output processor (34) delivers data to the multimedia application 4. The packet buffer (33) stores data packets until the multimedia application requests that they be delivered to the multimedia application (4). If the packet buffer (33) does not have the requested data available, the client controller (36) signals the command processor (37) to send a command packet (a packet of information making a specific request) to the server control (1 in FIG. 1) for immediate retrieval of the requested data. The command processor (37) sends out the command packet via the control channel (5 in FIG. 1) and through the network interface (3).

Figure 3:
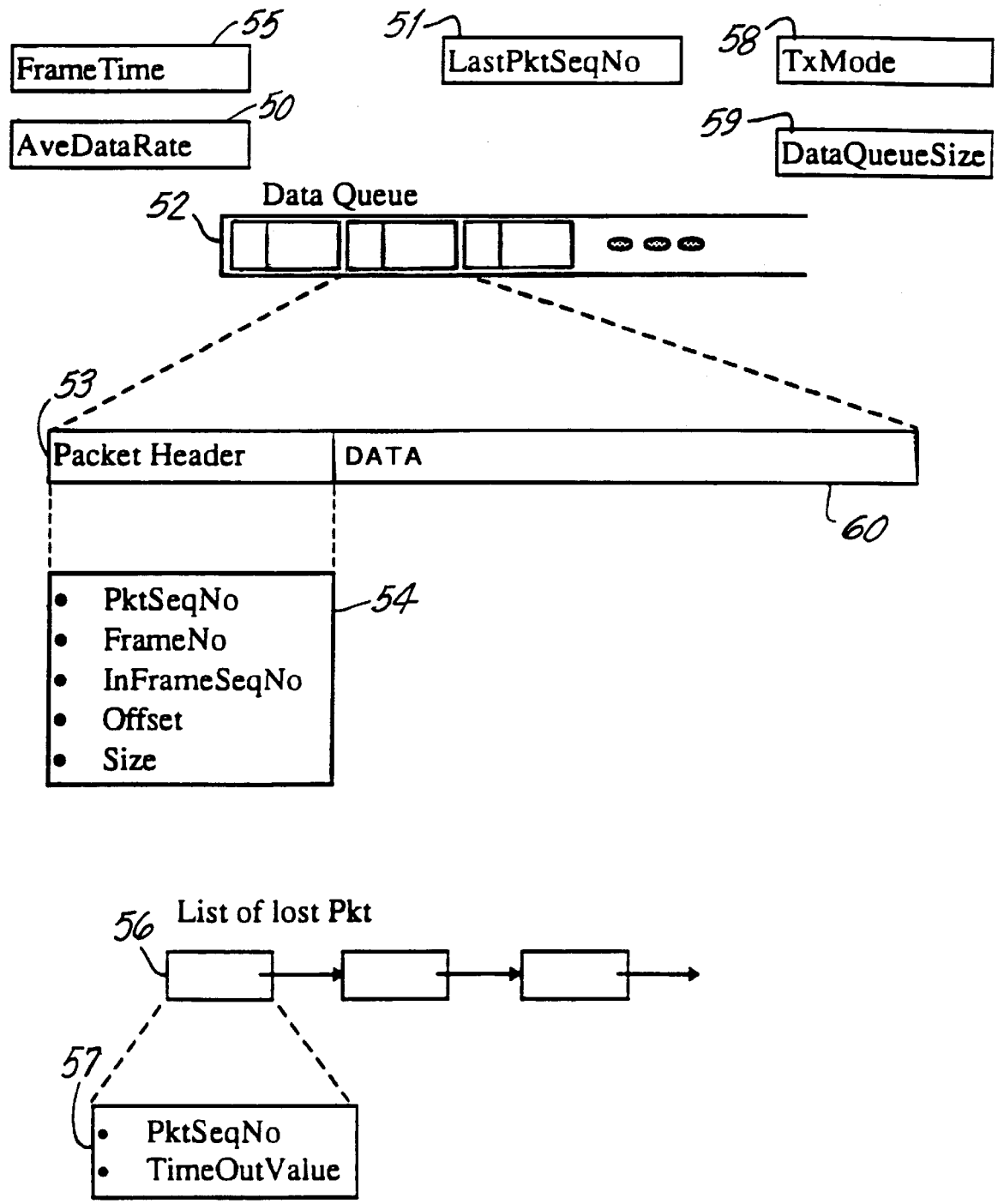
FIG. 3 is a schematic illustration of the buffer management in the client agent.

The buffer manager (38) manages the structure of the data in the packet buffer (33). FIG. 3 describes in detail the structure of the packet buffer (33). As to the amount of data, ideally the packet buffer (33) should have enough data: (i) to minimize the possibility of not having the requested data, and (ii) still have enough free buffer space (memory space) to receive new data packets. "Water Marks" regulate the server's transmission rate thereby balancing between these two conflicting factors. Three transmission modes are defined: NORMAL, RUSH, and PAUSE. Based on the amount of data in the packet buffer (33) the client agent (30) decides which is the appropriate mode. When a change occurs, the client agent (30) informs the server control (1). The client agent (30) changes the transmission mode based on a series of rules, explained below.

To understand these rules, one must first understand the "Water Mark" model. This model draws a parallel between the client agent buffer and a water bucket with a spout at the bottom that brings water to a person. Water entry (Application Data Unit, ADU entry) occurs intermittently. For example, other network traffic could slow ADU entry, or a collision sequence in the Ethernet, could stop it entirely. Assuming the bucket (client agent packet buffer) never empties, water exits from the spout at a constant rate. Continuing the bucket analogy, the bucket constitutes a set of frames in the packet buffer (33) which is the cache (temporary memory, generally RAM) used by the client agent. The bucket has high and lower "water marks". In the just-in-time retrieval method, when the amount of data falls between the water marks, transmission occurs in NORMAL mode. In the present invention the transmission should be in NORMAL mode most of the time. For example, the packet buffer will normally store 1–5 frames of video. In this mode the server (1) paces its transmission so that the data for a single video frame is transmitted in the time of a single video frame (normally 1/30 second), as FIG. 6 will discuss in detail. Transmission occurs very efficiently in this NORMAL mode because no need exists for the client agent (30) to send periodic feedback to the server control (1).

Transmission enters PAUSE mode when the amount of data exceeds the high water mark, i.e., there is too much data in the client agent packet buffer (33). Transmission occurs in RUSH mode when the amount of data falls below the lower water mark, i.e., there is not enough data in the client agent packet buffer (33). The client agent (30) sends a "NORMAL-TO-RUSH" command if the amount of data decreases below the low water mark. The client agent (30) sends a "NORMAL-TO-PAUSE" command if the amount of data increases above the high water mark. The client agent sends a "PAUSE-TO-NORMAL" command if the amount of data decreases from above to below the high water mark. The client agent (30) sends a "RUSH-TO-NORMAL" command if the amount of data increases from below the lower water mark to above the low water mark.

FIG. 3 schematically represents the structure of the packet buffer (33). Each data packet contains a packet header (53) and the multimedia data (60). The packet header (53) should contain at least the following five elements of information (54):

Pkt. Seq. No: a unique packet sequence number

Frame No.: the video frame number to which the data in the packet belongs

InFrame Seq. No: the sequence number of the packets within the same frame, e.g., 1 is for the first packet of a video frame, 2 the second, and so on, and 0 is the last packet of the frame Offset: file offset of the first data byte in the packet Size: the number of data bytes in this packet.

Figure 6:
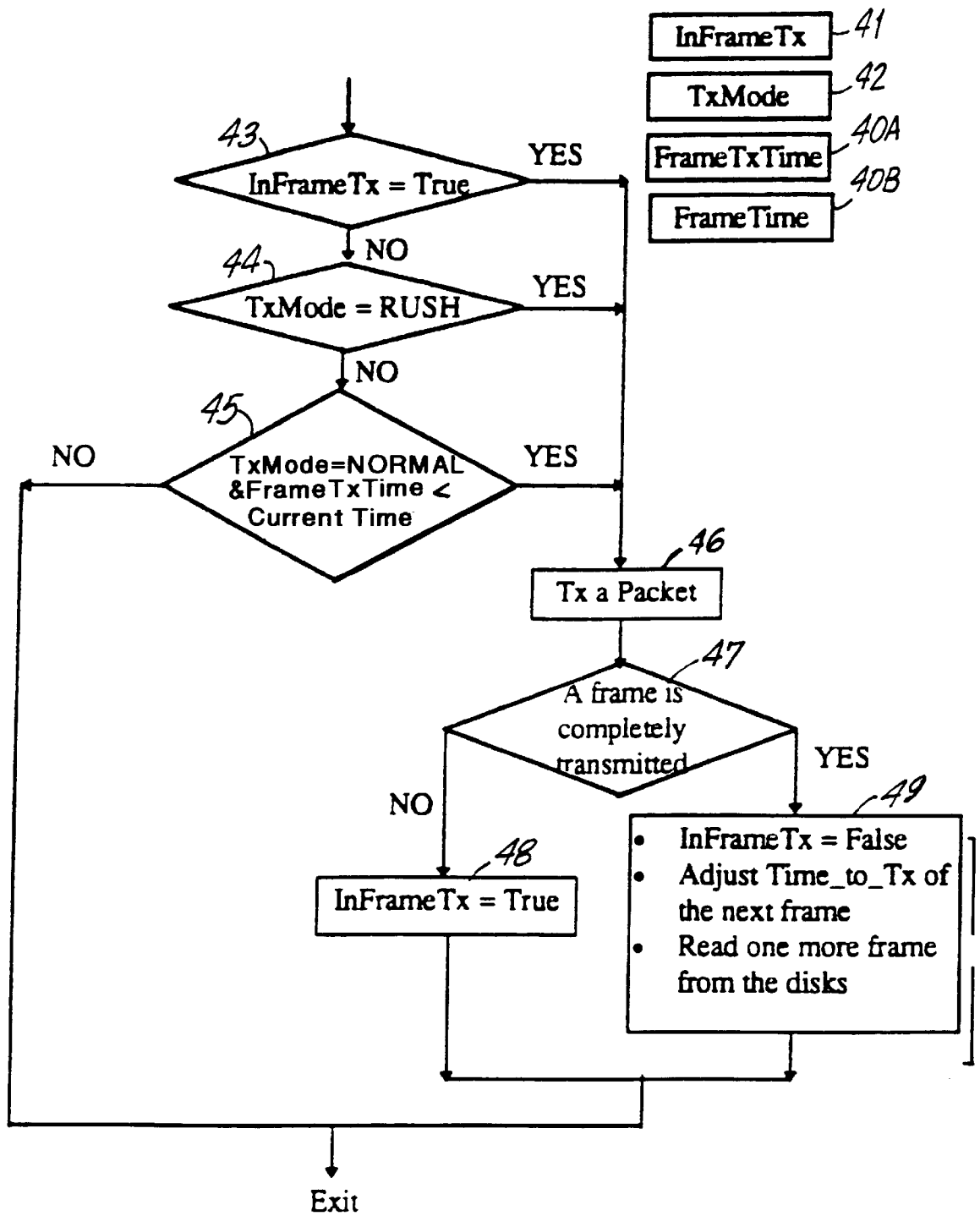
FIG. 6 is a schematic illustration of the transmission scheduling algorithm.

The transmission scheduler sets these data during packetization, as FIG. 6 discusses in detail. The data queue (52) organizes the packets by putting them in a specific order; the packets are sorted according to the "offsets" of the data. "Offset" is a number representing the relative position of a byte, generally in regard to the start of a file. The buffer manager maintains the packet structure until delivering the data to the applications. Two consecutive packets in the buffer need not have contiguous file offsets. For example, the user may select file portions which are not in order, i.e., one minute of video from the start of a video clip followed by one minute from the end of the clip. Therefore the file offset must be explicitly checked before delivering a data packet to the multimedia application (4). Otherwise an incorrect set of data may be delivered to the multimedia application (4).

Fast and mostly reliable UDP-like channels transmit data packets. At some network nodes, packets may be lost, for example, due to line noise or buffer overflow. In one error-free embodiment the lost packets are traced and replaced and in another embodiment, not error-free, there is no attempt to replace lost packets.

To detect lost packets, in an error-free embodiment, the client agent (30) uses a register to maintain a variable Last Pkt. Seq. No. (51), which is the packet sequence number of the last received packet. If the Pkt. Seq. No. of the newly arriving packet denoted as New Pkt Seq No differs from (Last Pkt. Seq. No. +1), then a packet loss has occurred. Specifically, the packets with Pkt. Seq. No.'s from (Last Pkt. Seq. No. +1) to (New Pkt. Seq. No. −1) have been lost.

To deal with packet loss, the client agent (30) maintains a list of lost packets (56) in a linked list or other data structure. That list records the two most important pieces of information about the lost packet, namely, its Pkt. Seq. No. and Time Out Value (57). When the client agent (30) sends the "retransmission request" for lost packets to the server control (1) the Time Out Value is set. If the missing data packet arrives correctly before the Time Out Value expires, this removes that data packet from the list. If not, the client agent (30) (i) either sends another "retransmission request" to the server control (1) or (ii) gives up on obtaining the missing data packet and removes its number from the lost packet list.

While providing data to the multimedia applications (40) the client agent (30) also monitors the characteristics of those applications. The frametime (55) and Ave. Data Rate (50) registers record the application's two most important characteristics, which are (i) average frame time and (ii) average data rate. In one embodiment, such monitoring is executed for each frame, i.e., executing the monitoring when the delivered packet has In Frame Seq. No. equal to zero. If these two average data rates differ significantly from the expectation of the server, which is transmitted to the client agent (30), the client agent (30) sends the corresponding commands, i.e., Frame Time Req. and Data Rate Req. to the server control (1).

To support regulation of the transmission pace with the amount of data in the packet buffer as described in connection with FIG. 2, the client agent (30) also maintains the Tx. Mode (58) and Data Queue Size (59) registers.

The design of the client agent provides efficiency and reliability in the transmission and display of multimedia files. A multimedia file may be played, i.e., displayed, in a variety of fashions. Some applications (or printing of a multimedia file) require error-free data, while some other applications require constant and minimum transmission latency (delay) at the expense of losing a small amount of packets, i.e., the transmission need not be error-free. The client agent (30) with its direct interfaces to the applications, can respond to the requirement of each application. The client agent provides only the support required by the application. Specifically, the design of the client agent (30) allows the client agent to (i) eliminate unnecessary protocol overhead (wasted memory and processing resources due to redundant computing instructions) embedded in typical transport protocols (data transmission methods), particularly those of reliable (error-free) transmissions; and (ii) provide functionality tailored to the needs of the applications such as error-free transmission and/or packet resequencing (reordering).

Figure 4:
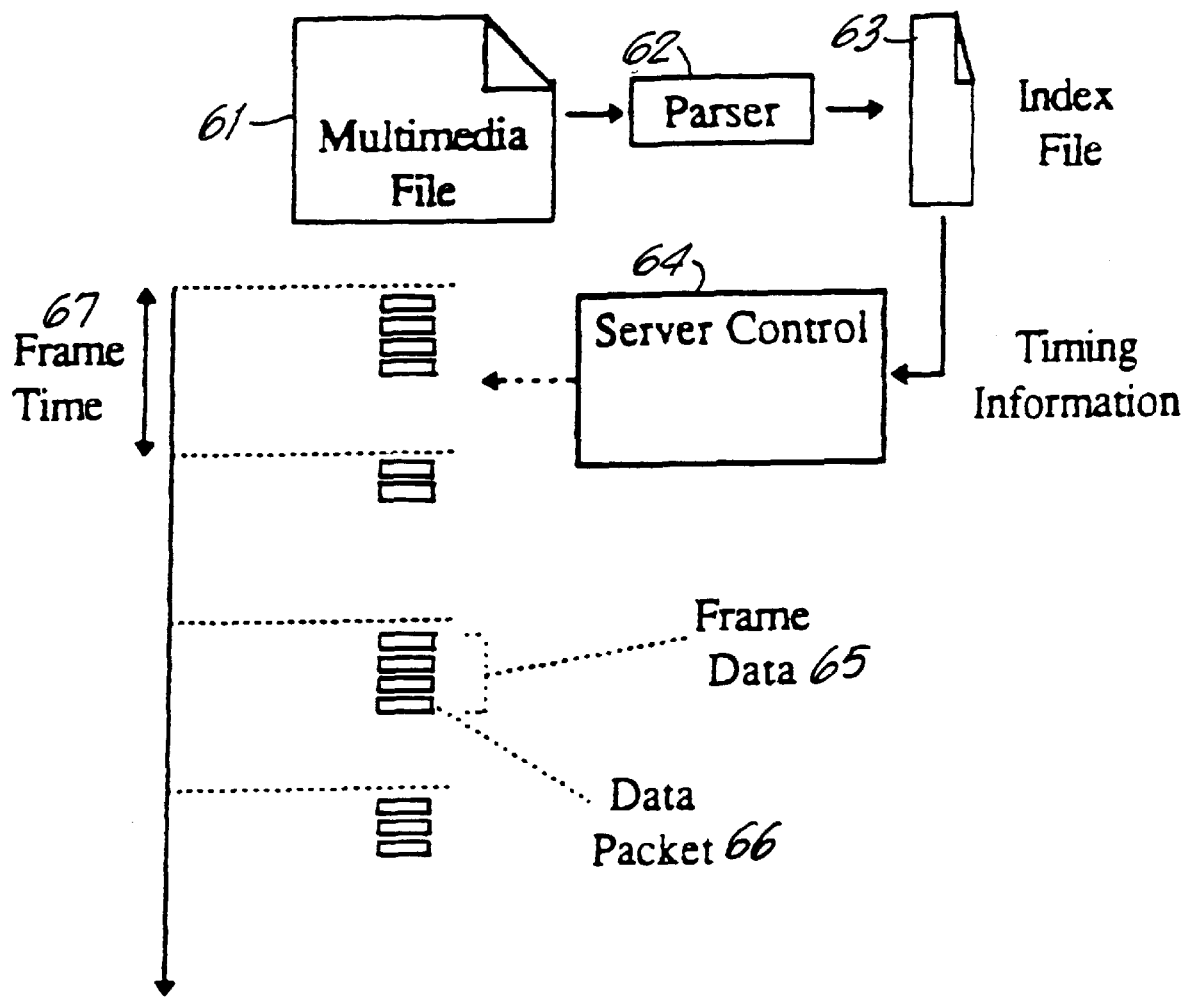
FIG. 4 is a schematic illustration of the desirable frame level pacing based on the essential timing information specified in multimedia files.

FIG. 4 schematically illustrates the preferred frame-level pacing based on the essential timing information which is specified in multimedia files. Ideally, the client agent (30) should play out multimedia streams, including audio and video, in certain periodic patterns. In motion video the picture resolution (or clarity) and the motion smoothness constitute the two most important quality factors. Motion smoothness relates directly to the playback frame rate, i.e., the number of frames played in a second. The NTSC signal specification (an American standard) is a frame rate of 30 frames per second, while PAL (a European standard) is 25 frames per second. Slightly lower frame rates, due to the constraints of capturing and/or decompression processes, are common and may be acceptable. Smooth playback also requires playing back frames at fixed intervals, i.e., the frame time, to ensure motion smoothness and picture quality.

Because of the timing feature described above, known as the "isochronous property", transmission of multimedia files requires consideration of factors that traditional data transport protocols (such as TCP/IP) do not deal with. Generally such data transport protocols (data transmission methods) treat a multimedia file as they do a text file and transmit as a byte stream. Consequently, they try to maintain an average transmission rate which does not account for the variance in individual frame size in video files.

Instead of focusing upon the average data rate, which only indirectly times data flow, the present invention provides a method for utilizing the most direct timing measure, the video frame rate. As depicted in FIG. 4, the server control (64) uses the timing information (66) in a multimedia file (61) to pace its transmission. The data in one frame is transmitted in one frame interval (frame time), as depicted by the frame data (65) and the frame time (67). The timing information may be extracted beforehand or on the fly (during multimedia file transmission). The frame size may differ, for example, one frame may be 10K bits and the next frame 25K bits; but each is transmitted in an equal frame time, for example, each is transmitted in 1/30 second.

FIG. 4 depicts extraction beforehand, in which a separate but accompanying index file (63) is generated by a parser (62) (a program which extracts semantic information). Generally, a multimedia file is created only once, but is retrieved many times. This makes it efficient to store the index file for future uses.

The frame time specified in the multimedia file constitutes a key piece of information in the index file. This frame time can be changed at runtime (during transmission) if monitoring by the client agent (30) detects a different playback frame rate. This can occur when the client agent (30) does not have sufficient processing capability. For example, a video file captured at 30 frames per second may be played at only 15 frames per second in an Intel 486 DX2/66 (TM) based client agent while played at 30 frames per second in a faster client agent such as one based on an Intel Pentium 75 (TM). Similarly, insufficient network bandwidth may also reduce the playback frame rate.

Figure 5:
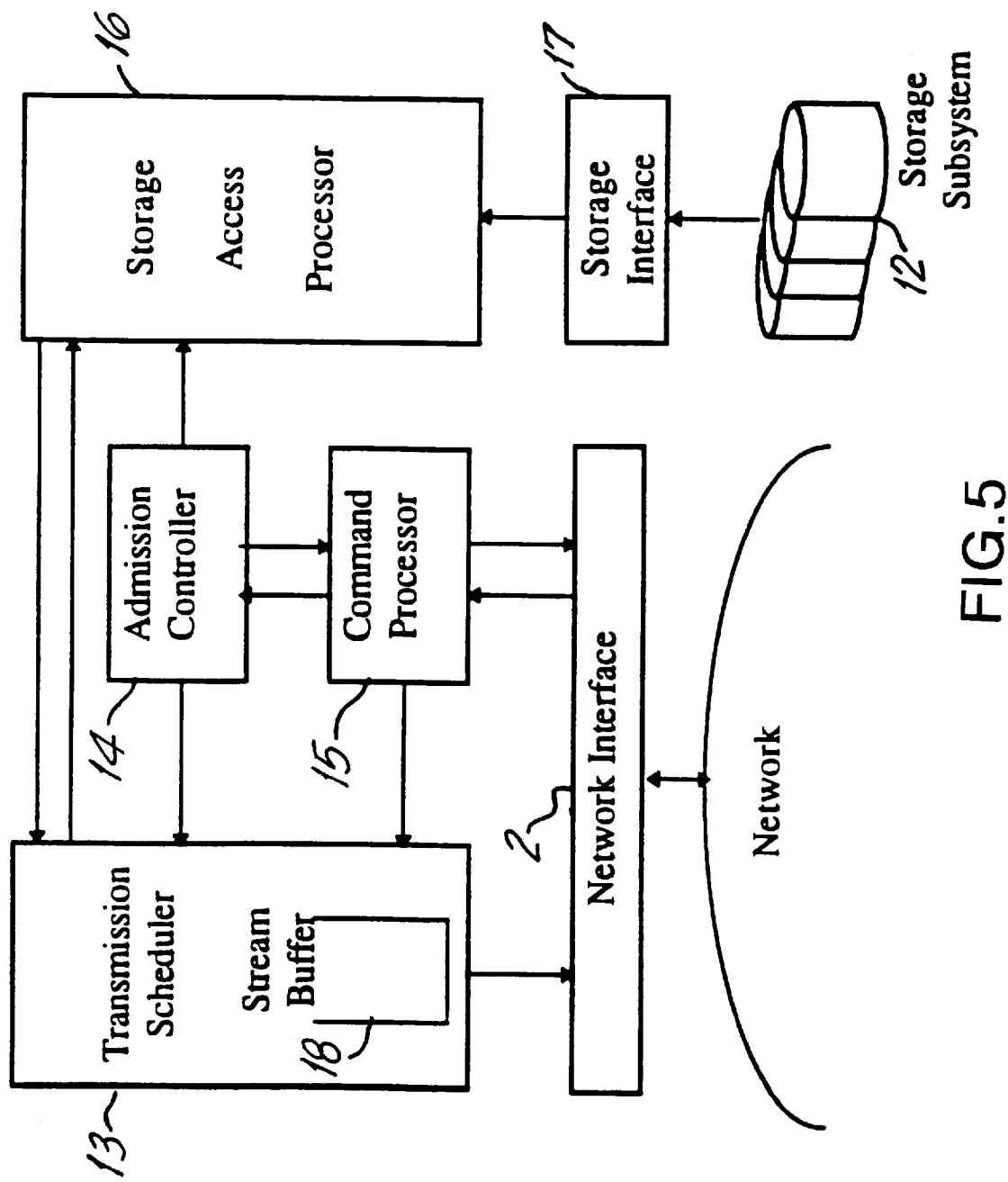
FIG. 5 is a schematic illustration of the design of the server.

FIG. 5 schematically represents the detailed structure of the server control (1) in FIG. 1. As in FIG. 1, the server control interfaces with the storage subsystem (12), a data memory storage of multimedia files, i.e., compressed video stored on disk arrays and CD-ROMS and the network interface (2). Two execution paths exist: one for control messages and one for data. The data execution path starts from the storage subsystem (12) and proceeds to the storage interface (17) to the storage access processor (16), to the transmission scheduler (13), and to the network interface (2). The computer file system, or its internal drivers, contains the storage devices (12) and the storage interface (17). The storage access processor (16) reads data from files into the stream buffer (18) based on requests of the transmission scheduler (13).

The transmission scheduler (13) drives the data flow. Its main tasks include reading data out of the storage subsystem (12), packetization, and packet transmission. It maintains the stream buffer (18) which stores data awaiting transmission. To avoid overloading the network and/or the client agent's receiving buffer, the transmission scheduler (13) properly schedules the data execution path, by considering the timing specification in the multimedia files and the timing requirements of the applications.

The command processor (15) drives the command path execution. In most situations receiving a command packet from the client agent (3) initiates the execution. The command processor (15) parses the packet and then invokes the appropriate functions, which may be embodied in a different process. Taking the "file open request" as an example, the command processor (15) signals the admission controller (14) to determine if a new session should be admitted. The admission controller makes its determination based on whether or not sufficient unused capacity exists in storage, processing, and network bandwidth. The admission controller (14) formulates a file open request response command which the command processor (15) sends to the client agent (30). The response indicates whether acceptance of the request occurred. If it did, the admission controller (14) sets up the necessary structure, including the stream buffer (18) and then signals the transmission scheduler (13) which in turn includes the new file in its scheduling cycles.

FIG. 6 schematically represents the scheduling operations of the transmission scheduler (13). It uses four key registers, Frame Tx Time (40A), Frame Time (40B), In Frame Tx. (41) and Tx. Mode (42), in the following ways:

(i) Frame Tx. Time (40A) provides the start time for transmitting a frame.

(ii) Frame time (40B) provides the interval of time between the beginning of the playback of two consecutive video frames. The frame scheduler uses the average value if it lacks a constant value. The scheduler uses frametime (40B) in setting Frame Tx. Time (40A).

(iii) In Frame Tx. (41) has two values, TRUE and FALSE, making it a flag. When set to TRUE, it indicates that the transmission of a frame has been started but not yet completed. When set to FALSE, it indicates a frame awaits its Frame Tx. time (the time when the transmission scheduler (13) starts transmitting the frame's data). With this flag, the transmission scheduler (13) controls pacing only among frames but not within an individual frame.

(iv) Tx. Mode (42) indicates the current transmission mode which can be NORMAL, RUSH or PAUSE. In most situations the Tx. Mode is NORMAL. The NORMAL mode executes frame level pacing and requires minimum overhead, because limited interaction occurs between the client agent (30) and the server control (1). The transmission scheduler (13) handles multiple tasks simultaneously, including reading data from disks and transmitting packets for multiple sessions (multiple sessions of viewing video). For each individual session packet transmission occurs (46) if one, or more, of the following conditions are satisfied:

In Frame Tx.=TRUE (43), i.e., the transmission of a frame has been started but not yet completed, or Mode=RUSH (44), which means a low amount of data exists in the client agent's packet buffer (33), or Mode=NORMAL and Frame Tx. Time<Current Time (45), which means the transmission mode is NORMAL and transmission of another frame should begin.

Also, In Frame Tx.=False must occur (an implicit condition to begin transmission).

Conversely, the transmission scheduler does not transmit a packet in one of the following two conditions:

Mode=PAUSE, a setting which occurs when the server (1) should temporarily halt any transmissions because the client agent's packet buffer (38) is near saturation, or Mode=NORMAL and In Frame Tx.=False and Frame Tx. Time>Current Time, the state when transmission of a frame has been completed and the next frame still awaits its time to start transmission.

If a packet is transmitted (46), a check occurs to see whether the packet is the last packet of a frame. If not (48), In Frame Tx. is set to TRUE. If yes, i.e., complete transmission of a frame has occurred, In Frame Tx. is set to FALSE (49) and the Frame Tx. Time of the next frame is calculated as the sum of the current Frame Tx. Time and Frame Time. A reading of one more frames from the storage subsystem (12) begins.

The client agent (30) sets the values of Tx. Mode and Frame Time via the command packets, frame time change and transmission mode change, respectively. The client agent also transmits a "lost packet request" to request the transmission scheduler (13) to obtain the specified "lost" packets and to retransmit them as soon as possible. These packets may still be in the stream buffer, in which case the transmission scheduler (13) responds to the request immediately. Otherwise, the transmission scheduler (13) reads the relevant data from the storage subsystem (12) and then transmits them as soon as possible.

Finally, the above-described embodiments of the invention are only illustrative. Numerous alternative embodiments may be devised by those skilled in the art without departing from the spirit and scope of the following claims.

What is claimed is:

1. A method of transmitting data packets of bytes derived from a compressed video file which is stored in a server computer, the transmission being over a computer network to a client computer connected onto the network, in which the client computer decompresses the video file as a sequence of video frames;

characterized in that the server computer transmits the data packets at a transmission rate determined by the number of bytes (frame size) of each individual video frame, at least 10 frames per second, and not by a rate determined by the number of bytes per second to be transmitted.

2. A method as in claim 1 wherein the frames are displayed at a rate of 10–30 frames per second.

3. A method as in claim 1 and further including the step of inserting into each data packet a series of bytes representing picture content and a header, the header having a frame number and the sequence number of the data packet within each frame number.

4. A method as in claim 1 and further including the step of storing 1–5 video frames within a buffer of the client computer.

5. A method as in claim 4 and further including the step of selecting a normal range of frames to be stored in the buffer; decreasing the transmission rate if the number of frames in the buffer is above the selected range and increasing the transmission rate if the number of frames in the buffer is below the selected range.

6. A method as in claim 5 and further including the step of transmitting a frame of video within a frame time (the time that a frame of video is displayed) when the number of frames in the buffer is within the selected range.

7. A method as in claim 6 and further including the step of having the client computer monitor and log frame time and data rate of the video display and transmit the log to the server computer.

8. A method as in claim 1 wherein the transmission rate is generated by the server computer based upon frame timing of the video file.

9. A method as in claim 1 and including the further step of the server computer generating a separate index file containing a frame rate of a video file and using the index file to determine the transmission rate when the video file is transmitted.

10. A method as in claim 1 and further including the step of numbering each data packet in sequence and the client computer recording the sequence numbers to determine if data packets are lost in transmission.

11. A method in a computer network comprising a plurality of computers comprising a client agent in a client computer interacting with a server, a multimedia application executed by the client computer and derived from a multimedia file, including a compressed video file, stored in the server, the method being for just-in-time retrieval of the multimedia file and its transmission from the server to the client agent, the method comprising the steps of:
(a) having the server extract timing information, including the number of bytes (frame size) of each video frame, from the multimedia file and store the timing information in a separate and accompanying index file;
(b) having the server transmit the multimedia file over the network based upon the timing information, including information regarding the number of bytes (frame size) of each video frame, in the index file; and
(c) having data of the multimedia file packetized and transmitted by the server to the client agent and executed by the client agent.

12. A method as in claim 11 and further including the step of directly interfacing the client agent with an application so that the client agent monitors and logs the behavioral characteristics of the application, and using said log to assist in optimizing subsequent transmission of the application.

13. The method of claim 11 wherein the timing information in the index file comprises, for video, the frame time, the average data rate, and the file offset of each video frame.

14. The method of claim 11 and further including the step of saving the index file in data storage of the server along with the multimedia file for future retrieval.

15. The method of claim 11 as applied to the transmission of video and scheduling transmission of the multimedia file so that under normal situations data of one video frame is transmitted in one frame time.

16. The method of claim 15 further comprising the steps of:
storing data of a 1–5 video frames of the multimedia file in a stream buffer of the server;
segmenting data of each video frame into a plurality of data packets with packet headers indicating the position of each data packet within the frame;
separating the start time for transmitting two consecutive video frames by the frame time; and
transmitting data packets of the same video frame before transmitting data packets of another video frame.

17. The method of claim 11 and further including the step of having the client agent regulate transmission of the multimedia file in response to exceptional situations.

18. The method of claim 17 further comprising the steps of using a register, Tx. Mode to indicate an appropriate transmission mode from the server to the client agent;
(i) setting the value of the Tx. Mode based on commands sent by the client agent;
(ii) executing steps of claim 16 when Tx. Mode= NORMAL;
(iii) halting transmission when Tx. Mode=PAUSE; and
(iv) ignoring the timing information in the index file and transmitting as fast as possible when Tx. Mode=RUSH.

19. The method of claim 11 and further comprising the steps in which:
(i) the client agent maintains a packet buffer to store arriving data packets from the server;
(ii) the client agent establishes a low threshold and a high threshold for the packet buffer and compares the amount of data in the packet buffer with the thresholds;
(iii) the client agent sends commands to instruct the server to transmit faster if data in the packet buffer falls below the low threshold;
(iv) the client agent sends commands to instruct the server to transmit slower if data in the packet buffer exceeds the high threshold;
(v) the client agent sends commands to instruct the server to transmit at a normal rate if data in the packet buffer falls in between the thresholds.

20. The method of claim 11 and including the steps of formatting the data of the multimedia file into packets and transmitting the packets to the client agent and further comprising the steps of:
(i) assigning each data packet a unique and sequentially assigned packet sequence number;
(ii) having the client agent record the sequence number of the last received data packet in a register;
(iii) having the client agent detect packet loss by comparing the sequence numbers of each arriving packet with an immediate prior arriving packet;
(iv) if a packet is lost, having the client agent decide whether it should request the server to retransmit the lost packet; and
(v) the client agent making the decision based on the behavioral characteristics and requirements of the application.

21. The method of claim 11 wherein the client agent monitors the behavioral characteristics of the application, further comprising the steps of:
using two registers, Frame Time and Ave. Data Rate, to record the application's playback frame time and average data rate respectively; and sending commands to instruct the server if significant changes occur in the Frame Time register or the Ave Data Rate register.

22. A computer network system comprising a plurality of computers including a plurality of client machines and a server machine, each client machine having a client agent interacting with the server machine, a multimedia application executed in the client machine and derived from a multimedia file, including a compressed video file, stored in the server machine, the system providing just-in-time retrieval of the multimedia file and its transmission from the server machine to the client machine, the system further comprising:

(a) an index file in the server machine comprising timing information based upon the number of bytes (frame size) of each video frame in the multimedia file, the index file being separate from, and accompanying, its corresponding multimedia file;

(b) server timing means to transmit the multimedia file over the network controlled by the timing information in the index file; and (c) server transmission means to packetize the data of the multimedia file and transmit the packetized data to the client machine.

23. A system as in claim 22 and further including interface means for interfacing the client agent with the application to monitor and log the behavioral characteristics of the application, and means for using said log to assist in optimizing subsequent transmission.

24. The system of claim 22 wherein the timing information in the index file comprises, for video, the frame time, the average data rate, and the file offset of each video frame.

25. The system of claim 22 wherein the index file is stored in data storage of the server machine along with the multimedia file.

26. The system of claim 22 wherein the timing information provides for scheduling transmission of the multimedia file so that under normal situations data of one video frame is transmitted in one frame time.

27. The system of claim 22 wherein the server machine has a stream buffer means for storing data of 1–5 video frames of the multimedia file;

the server transmission means includes segment means for segmenting data of each video frame into a plurality of data packets with packet headers indicating the position of each data packet within the frame;

the server transmission means includes separation means for separating the start time for transmitting two consecutive video frames by the frame time; and the server transmission means transmits data packets of the same video frame before transmitting data packets of another video frame.

28. The system of claim 22 and further including client agent means to regulate transmission of the multimedia in response to exceptional situations.

29. The system of claim 22 and further comprising a register, Tx. Mode to indicate an appropriate transmission mode from the server to the client agent and means for setting the value of the Tx. Mode based on commands sent by the client agent; halting transmission when Tx. Mode= PAUSE; and ignoring the timing information in the index file and transmitting as fast as possible when Tx. Mode= RUSH.

30. The system of claim 22 and further comprising:

(i) a packet buffer means in the client agent to store arriving data packets from the server;

(ii) threshold means in the client agent to establish a low threshold and a high threshold for the packet buffer and to compare the amount of data in the packet buffer with the thresholds;

(iii) command means in the client agent to instruct the server to transmit faster if data in the packet buffer falls below the low threshold and to instruct the server to transmit slower if data in the packet buffer exceeds the high threshold and to instruct the server to transmit at a normal rate if data in the packet buffer falls between the thresholds.

31. The system of claim 22 and including server transmission means for formatting the data of the multimedia file into packets and transmitting the packets to the client agent, the system further comprising:

(i) server means for assigning each data packet a unique and sequentially assigned packet sequence number;

(ii) a register means in the client agent for recording the sequence number of the last received data packet;

(iii) comparison means in the client agent to detect packet loss by comparing the sequence numbers of each arriving packet with an immediate prior arriving packet and to decide whether the client agent should request the server to retransmit the lost packet based on the behavioral characteristics and requirements of the application.

32. The system of claim 22 wherein the client agent monitors the behavioral characteristics of the application, the system further comprising:

(i) two register means in the client agent (Frame Time and Ave. Data Rate) to record the application's playback frame time and average data rate respectively; and (ii) client agent means to instruct the server if significant changes occur in the Frame Time register means or the Ave. Data Rate register means.

33. A computer network system comprising a plurality of computers including a plurality of client computers each having a screen and means for decompressing compressed video files, and a server computer having transmission means for transmission of digital data files as data packets of bytes, a video application executed in the client computer and derived from a compressed video file stored in the server computer, the video file being displayed on the client computer's screen as a sequence of video frames, the system providing just-in-time retrieval of the compressed video file and its transmission in data packets from the server computer to the client computer, the system further comprising:

server computer means for transmitting data packets at a transmission rate determined by the number of bytes (frame size) of each video frame and by the rate of at least 10 frames per second the video frames are displayed on the client computer's screen and not by a rate determined by the number of bytes per second to be transmitted.

34. A system as in claim 33 wherein the frames are displayed at a rate of 10–30 frames per second.

35. A system as in claim 33 and further including server computer means for inserting into each data packet a series of bytes representing picture content and header, the header having a frame number and the sequence number of the data packet within each frame number.

36. A system as in claim 33 and a buffer means in the client computer for storing 1–5 video frames.

37. A system as in claim 33 and means for selecting a normal range of frames to be stored in the buffer; decreasing the transmission rate if the number of frames in the buffer is above the selected range and increasing the transmission rate if the number of frames in the buffer is below the selected range.

38. A system as in claim 37 and further including means for transmitting a frame of video within a frame time (the time that a frame of video is displayed) when the number of frames in the buffer is within the selected range.

39. A system as in claim 37 and further includinng client computer means for monitoring and logging frame time and data rate of the video display to generate a log and transmitting the log to the server computer.

40. A system as in claim 33 and further including server computer means for generating the rate directly from a frame rate of the video file.

41. A system as in claim 33 and further including server computer means for generating a separate index file containing a frame rate of a video file and means for using the index file to determine the transmission rate when the video file is transmitted.

42. The system of claim 33 wherein the server computer has a stream buffer means for storing data of 1–5 video frames of the video file;

the server computer includes segment means for segmenting data of each video frame into a plurality of data packets with packet headers indicating the position of each packet within the frame;

the server computer includes separation means for separating the start time for transmitting two consecutive video frames by the frame time; and the server computer transmits data packets of the same video frame before transmitting data packets of another video frame.

* * * * *